T. E. ANDERBERG & A. R. GARDNER.
WEED AND INSECT DESTROYER.
APPLICATION FILED AUG. 22, 1910.
992,140.
Patented May 16, 1911.
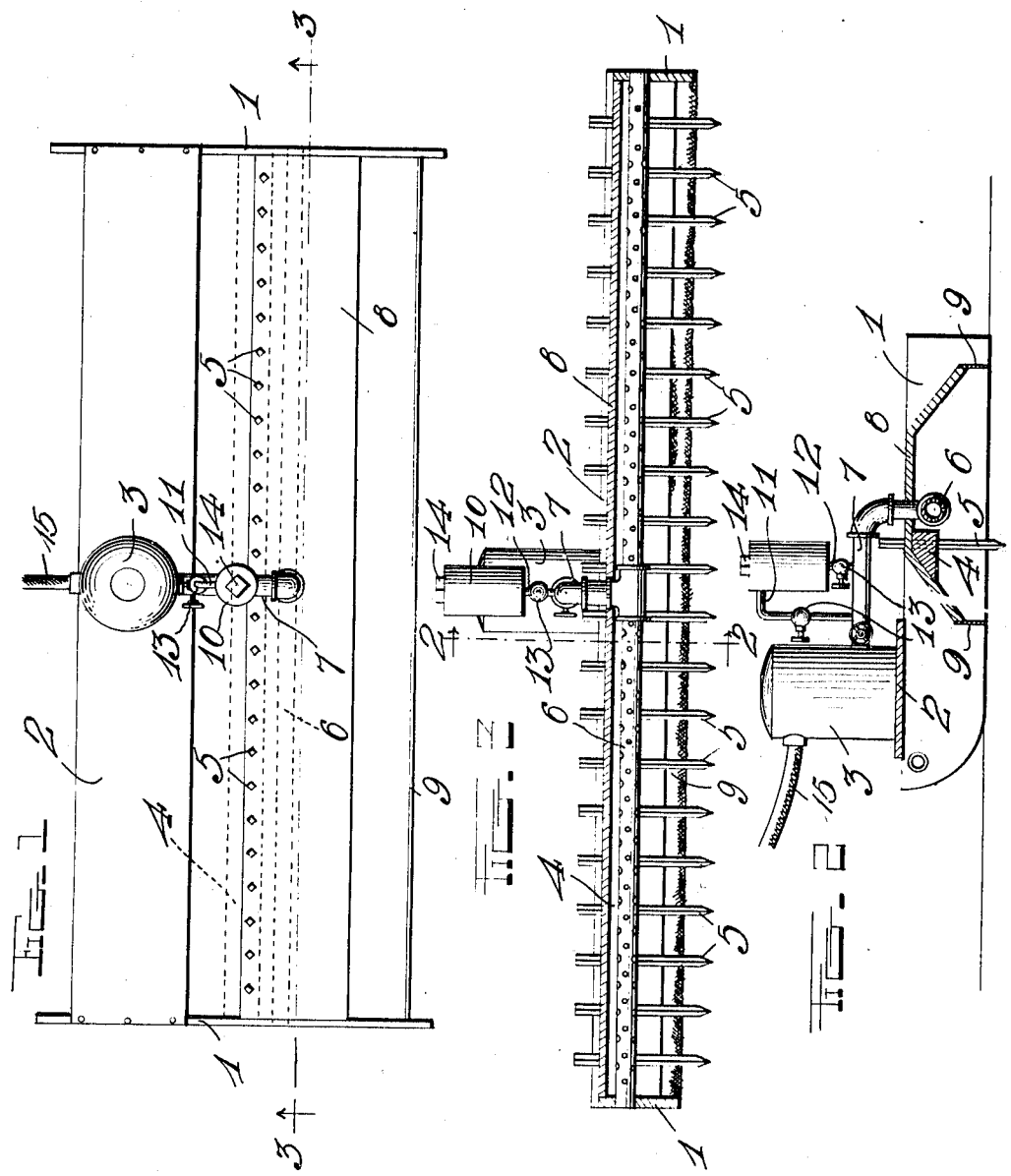
Witnesses
Inventors
T. E. Anderberg
A. R. Gardner
Attorneys

UNITED STATES PATENT OFFICE.

THOMAS E. ANDERBERG AND ARCHIBALD R. GARDNER, OF SANDY, UTAH.

WEED AND INSECT DESTROYER.

992,140.   Specification of Letters Patent.   Patented May 16, 1911.

Application filed August 22, 1910. Serial No. 578,421.

*To all whom it may concern:*

Be it known that we, THOMAS E. ANDERBERG and ARCHIBALD R. GARDNER, citizens of the United States, residing at Sandy, in the county of Salt Lake and State of Utah, have invented certain new and useful Improvements in Weed and Insect Destroyers; and we do declare the following to be a full, clear, and exact description of the invention, such as will enable others skilled in the art to which it appertains to make and use the same.

This invention relates to improvements in weed and insect destroyers.

One object of the invention is to provide an improved machine of this character having means whereby steam and chemicals are combined and discharged and means whereby the ground is broken or loosened up to permit the steam and chemicals to enter and impregnate the same.

With the foregoing and other objects in view, the invention consists of certain novel features of construction, combination and arrangement of parts as will be more fully described and particularly pointed out in the appended claims.

In the accompanying drawings: Figure 1 is a plan view of a weed destroyer constructed in accordance with the invention; Fig. 2 is a vertical longitudinal section on the line 2—2 of Fig. 3; Fig. 3 is a transverse section on the line 3—3 of Fig. 1.

In the embodiment of the invention we provide a supporting device which is here shown and is preferably in the form of a sled comprising runners 1, on which is arranged a suitable platform 2, adapted to contain a steam receiving tank 3, of any suitable character. Arranged between the runners 1 substantially midway their ends is a transverse bar 4 in which is secured a series of cultivating teeth 5, said teeth being spaced apart at suitable distances and projecting downwardly to a sufficient extent to thoroughly break up or loosen the ground when the sled is drawn over the same. Also arranged transversely or between the runners immediately in the rear of the row of cultivator teeth is a perforated discharge pipe 6 which is connected by a steam and chemical conducting pipe 7 with the steam tank 3. Over the pipe 6 and bar 4 is arranged a housing or hood 8 which inclines downwardly at its front and rear edges and is designed to hold the heat and steam discharged by the pipe 6 down into engagement with the surface of the ground. The front and rear lower edges of the hood 8 have attached thereto the upper ends of flexible aprons 9 which are preferably formed of canvas or heavy fabric and which are intended to engage the ground and thereby form a tighter closure for the hood when the machine is drawn over uneven surfaces.

In connection with the steam discharge pipe we provide a tank 10 which is adapted to contain suitable chemicals intended to be mixed with the steam whereby the latter is made more efficient in the destruction of certain weeds and insects. The tank 10 is connected to the steam pipe 7 by an inlet pipe 11 and discharge pipe 12 which are arranged as shown in the drawings and are provided with cut off valves 13 whereby the flow of steam into the tank and the discharge of the chemicals therefrom is controlled. The tank is provided with a filling opening closed by a suitable plug 14.

The hood 8 may be formed of wood, metal, canvas or other fabric and supported in operative position in any suitable manner.

When in use the device is intended to be attached to and drawn by a traction engine or other form of portable boiler which also supplies steam to the steam tank 3 on the sled through a flexible steam conducting pipe 15.

A destroyer constructed in accordance with our invention having means to loosen or break up the ground and means for discharging steam or destroying fluids directly into the loosened or broken ground will thoroughly destroy all weeds at their roots and will also destroy all insects which exist on or below the surface of the ground.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim is:

1. A weed and insect destroyer comprising a sled, a perforated steam discharge pipe carried thereby, means for supplying steam to said pipe, a series of ground loosening or breaking teeth arranged in said sled immediately in front of said discharge pipe, a hood arranged over said discharge pipe and having flexible curtains depending from the front and rear edges of the hood to the ground.

2. A weed and insect destroyer comprising a carrier, a steam tank mounted on the carrier, a steam and chemical discharge pipe connected with said tank, a series of ground breaking teeth carried by said carrier immediately in front of said discharge pipe, a chemical tank mounted on the carrier, and valved connections between the opposite ends of said tank and said steam discharge pipe whereby steam may be circulated through the said tank to be impregnated with chemicals before emerging from the discharge pipe.

In testimony whereof we have hereunto set our hands in presence of two subscribing witnesses.

THOMAS E. ANDERBERG.
ARCHIBALD R. GARDNER.

Witnesses:
 HENRY G. MARRIOTT,
 WILLIAM G. P. BRADBURY.

Copies of this patent may be obtained for five cents each, by addressing the "Commissioner of Patents, Washington, D. C."